United States Patent
Dassanayake et al.

(10) Patent No.: US 8,723,424 B2
(45) Date of Patent: May 13, 2014

(54) LIGHT ASSEMBLY HAVING LIGHT SOURCES AND ADJACENT LIGHT TUBES

(75) Inventors: Mahendra Dassanayake, Bloomfield Hills, MI (US); Gennaro Fedele, West Bloomfield, MI (US); James A. Karchon, Auburn Hills, MI (US); Alles Hiranthini, Livonia, MI (US)

(73) Assignee: eLumigen LLC, Auburn Hills, MI (US)

( * ) Notice: Subject to any disclaimer, the term of this patent is extended or adjusted under 35 U.S.C. 154(b) by 142 days.

(21) Appl. No.: 13/334,695

(22) Filed: Dec. 22, 2011

(65) Prior Publication Data

US 2012/0169235 A1 Jul. 5, 2012

Related U.S. Application Data

(60) Provisional application No. 61/428,366, filed on Dec. 30, 2010.

(51) Int. Cl.
*H01J 7/24* (2006.01)
*H05B 37/02* (2006.01)

(52) U.S. Cl.
USPC ............ 315/112; 315/113; 362/551; 362/555

(58) Field of Classification Search
USPC ......... 315/113, 112, 114, 116, 115, 117, 118; 362/551, 555
See application file for complete search history.

(56) References Cited

U.S. PATENT DOCUMENTS

| | | | |
|---|---|---|---|
| 4,727,289 A | 2/1988 | Uchida | |
| 5,132,875 A | 7/1992 | Plesinger | |
| 5,654,587 A | 8/1997 | Schneider et al. | |
| 6,019,493 A | 2/2000 | Kuo et al. | |
| 6,045,240 A | 4/2000 | Hochstein | |
| 6,149,283 A | 11/2000 | Conway et al. | |
| 6,538,892 B2 | 3/2003 | Smalc | |
| 6,659,632 B2 | 12/2003 | Chen | |
| 6,688,753 B2 | 2/2004 | Calon et al. | |
| 6,767,111 B1 | 7/2004 | Lai | |
| D494,687 S | 8/2004 | Matsui et al. | |
| 6,820,998 B2 | 11/2004 | Chen | |
| 6,827,475 B2 | 12/2004 | Vetorino et al. | |
| 6,840,654 B2 | 1/2005 | Guerrieri et al. | |
| 6,864,513 B2 | 3/2005 | Lin et al. | |
| 6,948,829 B2 | 9/2005 | Verdes et al. | |

(Continued)

FOREIGN PATENT DOCUMENTS

CN   2444117 Y   8/2001
DE   1 566 447    4/1980

(Continued)

*Primary Examiner* — David H Vu
(74) *Attorney, Agent, or Firm* — Harness, Dickey & Pierce P.L.C.

(57) ABSTRACT

A light assembly includes a light source circuit board and a plurality of light-emitting diodes disposed on the light source circuit board. A plurality of light pipes axially extends from and adjacent to each light-emitting diode. Each light pipe has a respective first end adjacent to the plurality of light-emitting diodes and a second end opposite to the light-emitting diodes. The plurality of light pipes communicates light from the light-emitting diodes therethrough and defines a cavity therebetween. A plurality of thermal vanes forms a heat sink for removing heat from the light-emitting diodes. The plurality of thermal vanes extend adjacent to the plurality of light pipes. A driver circuit board is disposed within the cavity.

20 Claims, 12 Drawing Sheets

(56) References Cited

U.S. PATENT DOCUMENTS

| | | |
|---|---|---|
| 6,965,205 B2 | 11/2005 | Piepgras et al. |
| 6,982,518 B2 | 1/2006 | Chou et al. |
| 7,038,399 B2 | 5/2006 | Lys et al. |
| 7,068,512 B2 | 6/2006 | Lee et al. |
| 7,125,160 B2 | 10/2006 | Wong et al. |
| D531,740 S | 11/2006 | Maxik |
| D532,532 S | 11/2006 | Maxik |
| 7,160,012 B2 | 1/2007 | Hilscher et al. |
| 7,161,311 B2 | 1/2007 | Mueller et al. |
| 7,181,378 B2 | 2/2007 | Benitez et al. |
| D538,950 S | 3/2007 | Maxik |
| D538,952 S | 3/2007 | Maxik et al. |
| 7,226,189 B2 | 6/2007 | Lee et al. |
| 7,246,919 B2 | 7/2007 | Porchia et al. |
| 7,253,447 B2 | 8/2007 | Oishi et al. |
| D553,266 S | 10/2007 | Maxik |
| 7,319,293 B2 | 1/2008 | Maxik |
| 7,344,279 B2 | 3/2008 | Mueller et al. |
| D566,309 S | 4/2008 | Kornfeld et al. |
| D566,323 S | 4/2008 | Piepgras et al. |
| 7,350,936 B2 | 4/2008 | Ducharme et al. |
| 7,352,138 B2 | 4/2008 | Lys et al. |
| 7,358,679 B2 | 4/2008 | Lys et al. |
| 7,367,692 B2 | 5/2008 | Maxik |
| 7,375,476 B2 | 5/2008 | Walter et al. |
| 7,396,142 B2 | 7/2008 | Laizure, Jr. et al. |
| 7,401,948 B2 | 7/2008 | Chinniah et al. |
| 7,445,340 B2 | 11/2008 | Conner et al. |
| D584,838 S | 1/2009 | To et al. |
| 7,482,632 B2 | 1/2009 | Lu et al. |
| 7,497,596 B2 | 3/2009 | Ge |
| 7,520,634 B2 | 4/2009 | Ducharme et al. |
| 7,521,875 B2 | 4/2009 | Maxik |
| 7,524,089 B2 | 4/2009 | Park |
| 7,527,397 B2 | 5/2009 | Li |
| 7,540,616 B2 | 6/2009 | Conner |
| 7,547,894 B2 | 6/2009 | Agrawal et al. |
| 7,604,378 B2 | 10/2009 | Wolf et al. |
| 7,607,802 B2 | 10/2009 | Kang et al. |
| D604,434 S | 11/2009 | Wada et al. |
| 7,786,455 B2 * | 8/2010 | Smith .................. 250/493.1 |
| 7,845,823 B2 * | 12/2010 | Mueller et al. ............ 362/231 |
| 8,072,123 B1 | 12/2011 | Han |
| 2003/0021117 A1 | 1/2003 | Chan |
| 2005/0094401 A1 | 5/2005 | Magarill |
| 2005/0152119 A1 * | 7/2005 | Lee et al. ................. 361/710 |
| 2005/0173675 A1 | 8/2005 | Schmidt et al. |
| 2006/0098440 A1 | 5/2006 | Allen |
| 2006/0238136 A1 | 10/2006 | Johnson, III et al. |
| 2006/0262544 A1 | 11/2006 | Piepgras et al. |
| 2007/0139938 A1 | 6/2007 | Petroski et al. |
| 2007/0165408 A1 | 7/2007 | Li |
| 2008/0013334 A1 | 1/2008 | Lu et al. |
| 2008/0093998 A1 | 4/2008 | Dennery et al. |
| 2008/0106893 A1 | 5/2008 | Johnson et al. |
| 2008/0232119 A1 | 9/2008 | Ribarich |
| 2008/0295522 A1 | 12/2008 | Hubbell et al. |
| 2008/0310158 A1 | 12/2008 | Harbers et al. |
| 2009/0001399 A1 | 1/2009 | Diana et al. |
| 2009/0059559 A1 | 3/2009 | Pabst et al. |
| 2009/0200950 A1 * | 8/2009 | Jensen .................... 315/113 |
| 2009/0230866 A1 | 9/2009 | He |
| 2009/0302237 A1 | 12/2009 | Bortz et al. |
| 2010/0010701 A1 | 1/2010 | Gärtner |
| 2010/0020538 A1 | 1/2010 | Schulz et al. |
| 2010/0096993 A1 * | 4/2010 | Ashdown et al. ........... 315/113 |
| 2010/0103666 A1 | 4/2010 | Chang et al. |
| 2010/0103669 A1 | 4/2010 | Yang et al. |
| 2010/0103671 A1 | 4/2010 | Zheng |
| 2010/0110683 A1 | 5/2010 | Fang et al. |
| 2010/0110687 A1 | 5/2010 | Zheng |
| 2010/0118537 A1 | 5/2010 | Shin |
| 2010/0135012 A1 | 6/2010 | Lee |
| 2010/0201269 A1 * | 8/2010 | Tzou et al. ................. 315/51 |
| 2010/0207534 A1 * | 8/2010 | Dowling et al. ............ 315/186 |
| 2010/0259200 A1 * | 10/2010 | Beausoleil ................. 315/320 |
| 2010/0327745 A1 * | 12/2010 | Dassanayake et al. ........ 315/35 |

FOREIGN PATENT DOCUMENTS

| | | |
|---|---|---|
| DE | 103 44 547 A1 | 8/2005 |
| EP | 1 411 290 A1 | 4/2004 |
| FR | 984.607 | 7/1951 |
| JP | 2003-31005 | 1/2003 |
| JP | 2006-156187 | 6/2006 |
| WO | WO 2004/100213 | 11/2004 |
| WO | WO 2007/067513 | 6/2007 |
| WO | WO 2009/063655 | 5/2009 |

* cited by examiner

LIGHT ASSEMBLY HAVING LIGHT SOURCES AND ADJACENT LIGHT TUBES

CROSS-REFERENCE TO RELATED APPLICATIONS

This application claims the benefit of U.S. Provisional Application Nos. 61/428,366, filed on Dec. 30, 2010, the entire disclosure of which is incorporated herein by reference.

TECHNICAL FIELD

The present disclosure relates generally to lighting using solid state light sources such as light-emitting diodes or lasers and, more specifically, to lighting devices that use light tubes for shaping the light output of the light assembly.

BACKGROUND

This section provides background information related to the present disclosure which is not necessarily prior art.

Providing alternative light sources is an important goal to reduce energy consumption. Alternatives to incandescent bulbs include compact fluorescent bulbs and light-emitting diode (LED) light bulbs. The compact fluorescent light bulbs use significantly less power for illumination. However, the materials used in compact fluorescent bulbs are not environmentally friendly.

Various configurations are known for light-emitting diode lights. Light-emitting diode lights last longer and have less environmental impact than compact fluorescent bulbs. Light-emitting diode lights use less power than compact fluorescent bulbs. However, many compact fluorescent bulbs and light-emitting diode lights do not have the same light spectrum as incandescent bulbs. They are also relatively expensive. In order to achieve maximum life from a light-emitting diode, heat must be removed from around the light-emitting diode. In many known configurations, light-emitting diode lights are subject to premature failure due to heat and light output causing increased temperatures at the light-emitting diode.

SUMMARY

This section provides a general summary of the disclosure, and is not a comprehensive disclosure of its full scope or all of its features.

The present disclosure provides a light assembly that includes a light source circuit board and a plurality of light sources disposed on the light source circuit board. A plurality of light pipes axially extend from and adjacent to each light source. Each light pipe has a respective first end adjacent to the plurality of light sources and a second end opposite to the light sources. The plurality of light pipes defines a cavity therebetween. A plurality of thermal vanes form a heat sink for removing heat from the light sources. The plurality of thermal vanes extends along the plurality of light pipes. A driver circuit board is disposed within the cavity.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description is merely exemplary in nature and is not intended to limit the present disclosure, application, or uses. For purposes of clarity, the same reference numbers will be used in the drawings to identify similar elements. As used herein, the phrase "at least one of A, B, and C" should be construed to mean a logical (A or B or C), using a non-exclusive logical OR. It should be understood that steps within a method may be executed in different order without altering the principles of the present disclosure.

It should be noted that in the following figures various components may be used interchangeably. For example, several different embodiments of control circuit boards and light source circuit boards are implemented. As well, various shapes of light redirection elements and heat sinks are also disclosed. Various combinations of heat sinks, control circuit boards, light source circuit boards, and shapes of the light assemblies may be used. Various types of printed, stamped, oxide-coated, anodized or laser cut electrically conductive layers and materials may also be used interchangeably in the various embodiments of the light assembly.

In the following figures, a lighting assembly is illustrated having various embodiments that include solid state light sources such as light-emitting diodes (LEDs) and solid state lasers with various wavelengths. Different numbers of light sources and different numbers of wavelengths may be used to form a desired light output depending upon the ultimate use for the light assembly. The light assembly provides an opto-thermal solution for a light device and uses multiple geometries to achieve the purpose.

Figure 1:
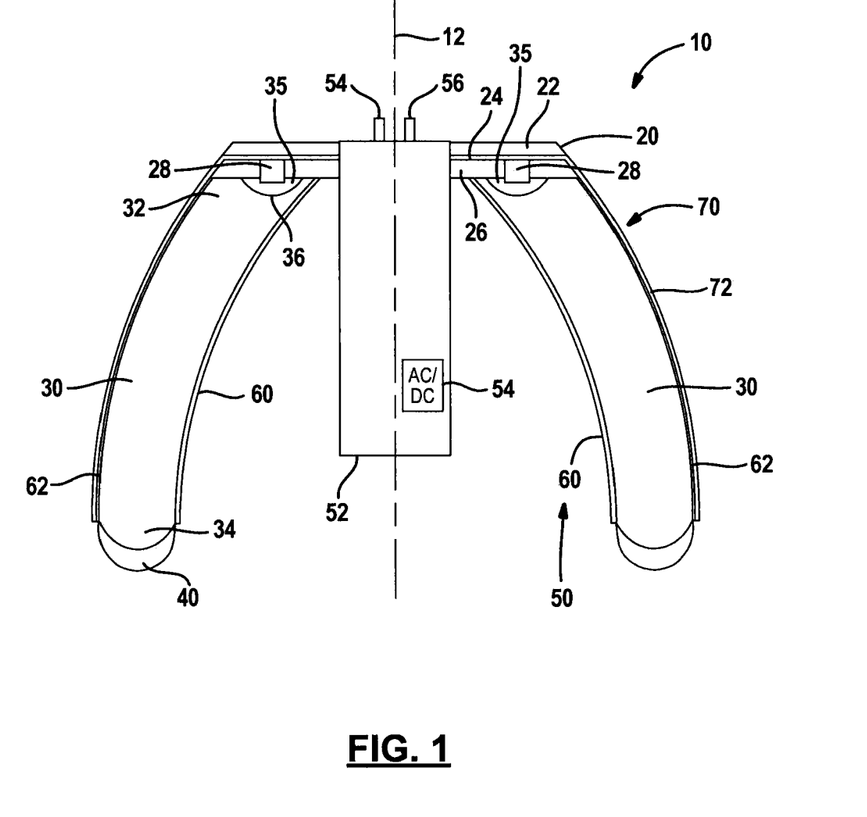
FIG. 1 is a cross-sectional view of a first embodiment of a light assembly according to the present disclosure.

Referring now to FIG. 1, a cross-section of a light assembly 10 is illustrated. Light assembly 10 includes a longitudinal axis 12. The light assembly 10 includes a light source circuit board 20 that has a plurality of layers thereon. In this example, the light source circuit board includes an insulating layer 22 (heat conductive, not electrically conductive), an electrically and thereby conductive layer 24, and another electrically insulating layer 26. The light source circuit board 20 may be formed of conventional material such as FR4 and metallic traces as the conducting layer 24. A multi-layer circuit board may also be used. The light source circuit board 20 may also be a laser-cut circuit board that has the circuit traces, solder pads or other conductors laser-cut thereon. Prior to cutting the conductors are over-molded with the insulating layer or layers 24, 26. The circuit board 20 may have a conductive layer 24 formed of a metal such as aluminum or stainless steel with an oxide layer or anodized layer as the non-electrically.

The metallic or conducting layer 24 may have a plurality of light sources 28 disposed thereon. The light sources 28 are solid state light sources such as lasers or light-emitting diodes. The lasers may be light-emitting diode-based. Thus, the term light-emitting diode can refer to both a laser and conventional light-emitting diode. The conducting layer 22 may have different sections that have various polarities so that a positive and negative potential difference may be generated to illuminate the light-emitting diodes. The circuit board 20 may have various shapes including a round shape. The circuit board 20 may have the light-emitting diodes or other light sources 28 disposed in a ring around the axis 12.

Each light-emitting diode 28 may have a light pipe 30 associated therewith. The light pipes 30 are elongated and extend in a direction generally axially from the light sources 28. In the present embodiment, the light pipes 30 also extend in a radially outward direction from the longitudinal axis of symmetry as well. The light pipes 30 in this embodiment are curved. Each light pipe 30 has a first end 32 adjacent to the light source 28 and a second end 34 opposite the light source 28. The first end 32 may include a cavity 35 and collimating optic 36 to collimate the light from the light source 28 into the light pipe 30. The cavity 35 encloses the light source 28. Of course, more than one light source may be enclosed within the cavity. One example of a suitable collimating optic 36 is a Fresnel lens. As will be further described below, total internal reflection or near total internal reflection may be used to reflect the light down the light pipe and out the second end 34.

The second end 34 may have a beam-forming optic 40 disposed thereon. The beam-forming optic 40 may be integrally formed with the second end 34 of the light pipe 30. A separate component may also house the beam-forming optic or optics. The beam-forming optic 40 may have various shapes to direct the light in a desired direction or pattern. Narrow beam-forming with little divergence may be desirable. Also, wide-spreading flood-type beam divergence may also be desired. The type of beam divergence or beam pattern depends upon the specific use for the light. Thus, various beam-forming optics may be used.

The plurality of light pipes 30 may be disposed in a circular pattern corresponding to the ring of the light sources 28. The light pipes 30 may form a cavity 50 therebetween. That is, the cavity 50 may be formed between opposite light pipes 30 to form a void therebetween. The cavity is within an inner surface of the light assembly. The cavity 50 is the volume between the light pipes 30.

The cavity 50 may have a driver circuit board 52 disposed therein. The driver circuit board 52 may be electrically and mechanically coupled to the light source circuit board 20. The driver circuit board 52 may have pins 54 and 56 extending therefrom. The pins 54 and 56 may be used to power the driver circuit board 52. Electrical connections between the driver circuit board and the circuit board 20 may also be formed so that the light sources 28 are powered thereby. The driver circuit board may include an AC to DC circuit 54 for powering the light sources 28. Of course, other circuits may be included such as dimmer circuits, timer circuits and sensor circuits.

The light pipes 30 may also include a coating 60, 62 thereon. The coating 60, 62 may be applied to the outer surface of the light pipe 30 to allow the light therein to internally reflect more efficiently. The coating 60, 62 may be a reflective coating. The coating 60, 62 may also be an energy-conversion (wavelength-converting) coating applied thereto. The coating 60, 62 allows the wavelength of the light travelling down the light pipe to convert from one wavelength to another wavelength. The amount of conversion may be regulated depending upon the type of coating. The coating 60, 62 may be a painted material or a polymer-type material applied to the outer surface of the light pipe. The coatings and wavelength-converting material are described further in FIGS. 9A-9C.

The conductive layer 24 of the circuit board 20 may also extend outward from the circuit board 20 and form a heat sink 70 adjacent to the light pipes 70 on an outer surface of the light assembly 10. The heat sink 70 may be formed fingers of the same material as the conducting layer 24. As is illustrated, the conducting layer 24 extends into the heat sink 70. However, different structures may be provided for the conducting layer 24 and the heat sink 70 that are coupled together during manufacture. The heat sink 70 draws heat from the light sources 28 in a radial direction and in an axial direction away from the light sources 28. The heat sink 70 may be referred to as a plurality of thermal vanes 72.

Figure 2A:
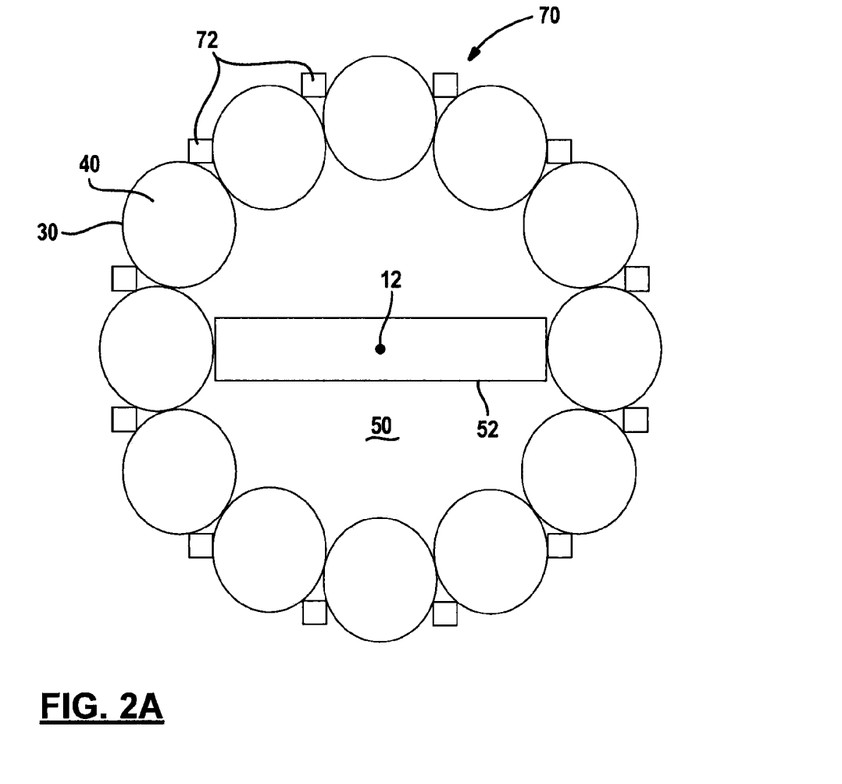
FIG. 2A is a top view of the light tubes according to the present disclosure.

Referring now to FIG. 2A, a top view of the plurality of light pipes 30 is illustrated. As is shown, a plurality of light pipes 30 is placed adjacent to each other in a circular pattern and is individually formed. The light pipes 30 have the beam-forming optics on the end thereof that is opposite the light sources 28. The light pipes 30 are formed around the cavity 50 which encloses the driver circuit board 52.

Each adjacent light pipe 30, in this example, has a thermal vane 72 therebetween. The thermal vane 72, as described above, may be formed of heat-conductive material that is thermally coupled to the light source 28 so that heat from the light source is drawn through the thermal vanes 72 into the atmosphere.

The light pipes 30 in FIG. 2A are in cross-sectional shape. In this example, the light pipes 30 are comparable to curved or bent cylinders. The light pipes 30 illustrated may have a shape comparable to an MR-type light. Straight or angled light pipes are also possible.

Figure 2B:
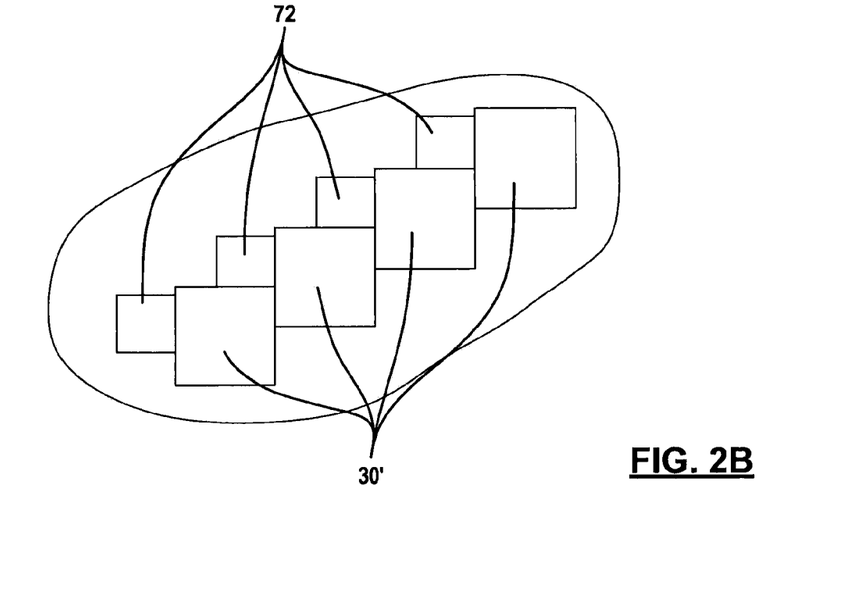
FIG. 2B is a top view of an alternative light pipe configuration.

Referring now to FIG. 2B, an alternate embodiment for a light pipe 30' is illustrated. In this example, the light pipes 30' have a square cross-sectional area. The thermal vanes 72 that form the heat sink are placed adjacent to two light pipes 30'. The light pipes may have various types of cross-sectional areas not illustrated in FIGS. 2A and 2B including irregular shapes, triangular shapes, octagonal shapes, hexagonal shapes and other quadrilateral cylindrical solids.

Figure 3:
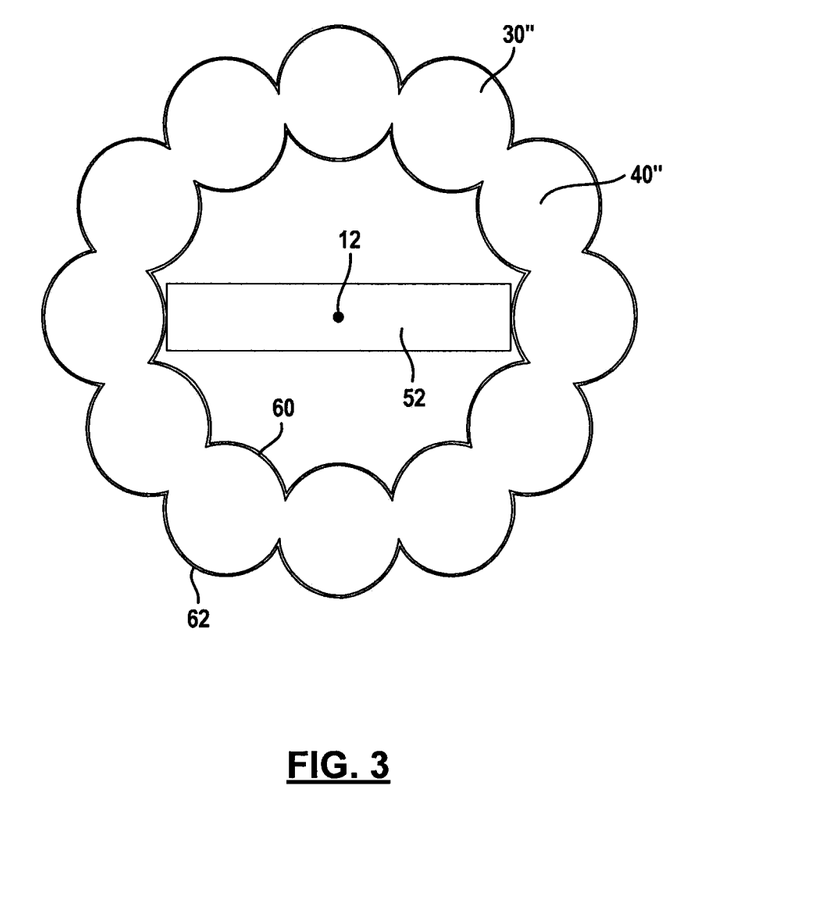
FIG. 3 is a top view of yet another alternative configuration for the light pipes.

Referring now to FIG. 3, an alternative embodiment to that set forth in FIGS. 1 and 2A is set forth. In this embodiment, all of the light pipes 30" are molded as a unitary structure. In the unitary structure adjacent light pipes are coupled together. The unitary structure of the light pipes 30" may in integrally molded to include both the light pipes 30", the beam-forming optics 40" and the collimating optics 36. By providing the unitary structure, the assembly of the light assembly may be more easily facilitated. The inner walls and outer walls of the light pipes 30" (relative to the cavity 50) may also include coatings 60 and 62 as illustrated in FIG. 1. However, in this embodiment, the coating is coated across the surface of all of the light pipes 30".

Figure 4A:
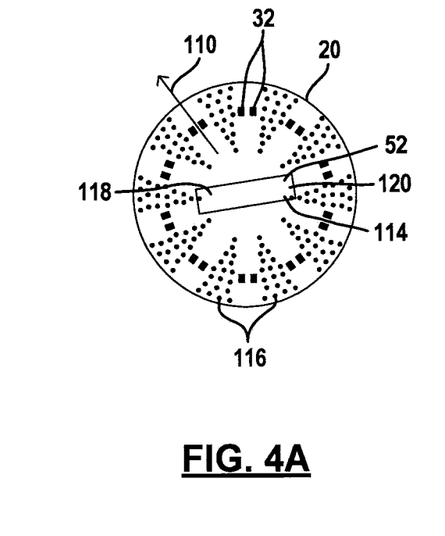
FIG. 4A is a top view of a circuit board according to the present disclosure.

Referring now to FIG. 4A, one embodiment of a circuit board 20 is illustrated. The circuit board 20 includes the plurality of light sources 28 thereon. The circuit board 20 includes a radial outward thermal path 110. An opening 114 may be provided through the circuit board 20 to receive the driver circuit board 52. The light sources 28 illustrated in FIG. 4 may have more electrical components for driving the light sources incorporated onto the circuit board 20. For example, solder pads 410 may be disposed on the circuit board 20 in pairs to mount the respective cathodes and anodes of the light-emitting diodes 28 thereon. Thermal vias 116 may be provided throughout the circuit board 20 to allow a thermal path to the thermal vanes 72 of the heat sink 70 as illustrated in FIG. 1. As is illustrated, the thermal vias 116 are generally laid out in a triangular or pie-piece arrangement but do not interfere with the thermal paths 110. Thermal vias 116 may also be placed directly under the light sources.

The circuit board 20 may be made out of various materials to form a thermally-conductive substrate. The solder pads of the light sources 28 may be connected to radial-oriented copper sectors or circular conductive elements that are overmolded into a plastic base to conduct heat away from the light sources. By removing the heat from the area of the light sources, the lifetime of the light assembly 10 may be extended as compared to non-heat removing assemblies. The circuit board 20 may be formed from two-sided FR4 material, heat sink material, or the like. If the board material is electrically conductive, the electrical traces may be formed on an electrically non-conductive layer that is formed on the electrically conductive surface of the circuit board. The electrically non-conductive layers may be formed of thermally conductive material such as thermally conductive plastic.

Electrical connections 118, 120 may be formed between the circuit board 20 and the drive circuit board 52 to provide power from the driver circuit board 52 to the light sources 28.

Figure 4B:
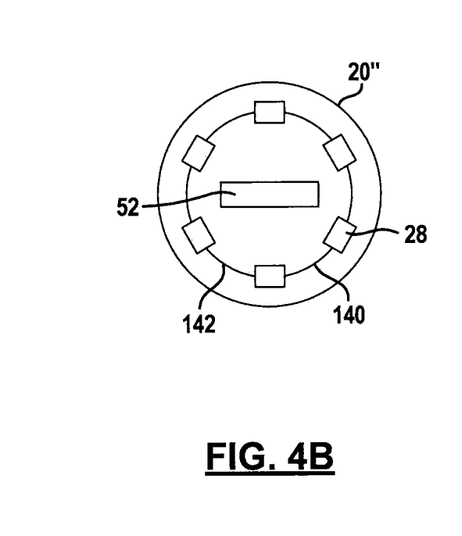
FIG. 4B is a top view of an alternate embodiment.

Referring now to FIG. 4B, an alternative embodiment of the circuit board 20' is illustrated. The circuit board 20' may include a plurality of circuit trace sectors 130 and 132 that are coupled to alternate voltage sources to power the light sources 28. The sectors 130, 132 are separated by a non-conductive gap 134. The light sources 28 may be electrically coupled to alternate sectors 130, 132. The light sources 28 may be soldered or otherwise electrically mounted to the two sectors 130, 132.

Each sector 130, 132 may be disposed on a non-conductive circuit board 20'. As mentioned above, the circuit board 20' may also be formed of a heat sink material. Should the heat sink material be electrically conductive, a non-conductive pad or layer may be placed between the sectors 130, 132 and the circuit board 20'.

Figure 4C:
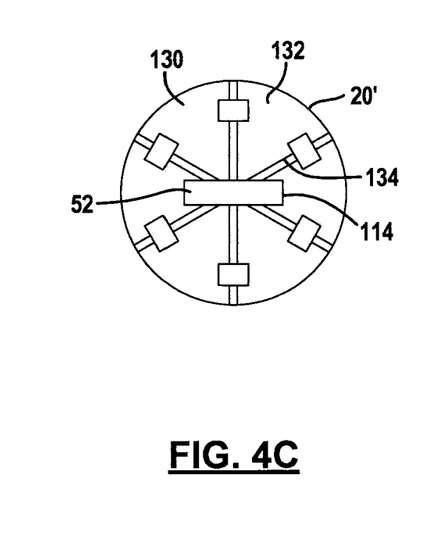
FIG. 4C is a top view of another alternate embodiment.

Referring now to FIG. 4C, another embodiment of a circuit board 20" is illustrated. The circuit board 20" includes the light sources 28 that are spaced apart by circuit traces 140 and 142. The circuit traces 140 and 142 may have different voltages used for powering or activating the light sources 32. The circuit traces 140, 142 may be printed on a substrate. Electrical connections may be made from the driver control circuit board.

Figure 5:
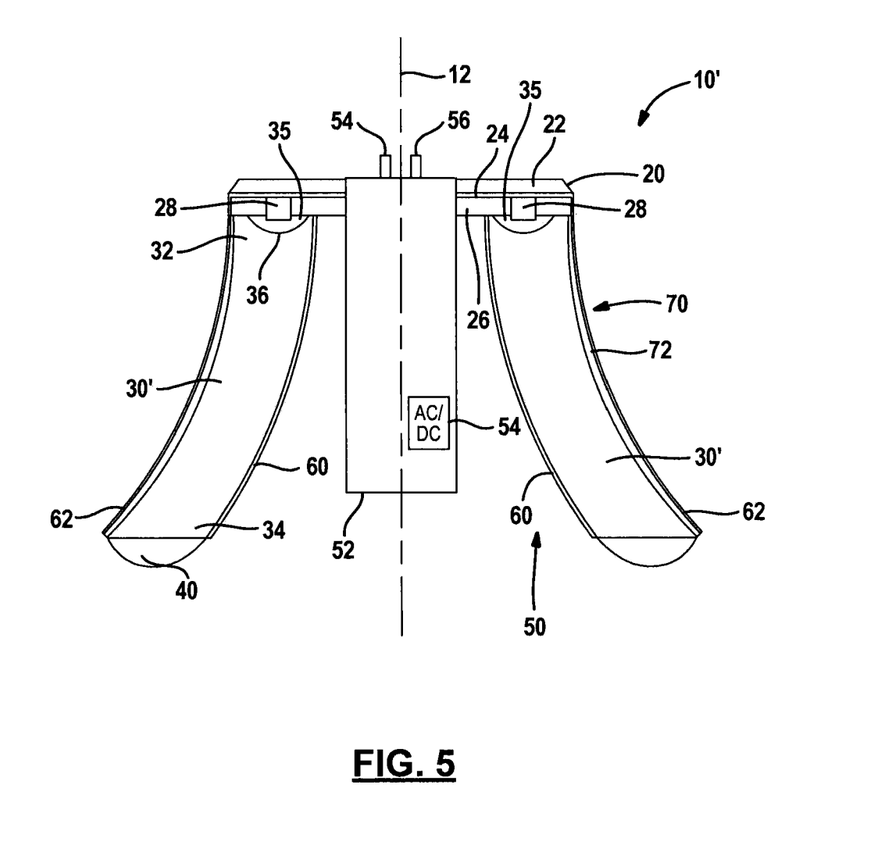
FIG. 5 is a cross-sectional view of the second embodiment of a light assembly according to the present disclosure.

Referring now to FIG. 5, another embodiment of a light assembly 10' is illustrated. In this embodiment, the structure is nearly identical to that set forth in FIG. 1. In this embodiment, however, the light pipes 30' are curved in the opposite direction. The curve of the light pipes 30' compared to FIG. 1 stays closer to the light forces and the longitudinal axis 12 and then curves away from the longitudinal axis at the second end 34.

The remaining components are the same and thus are labeled with the same reference numerals.

Figure 6:
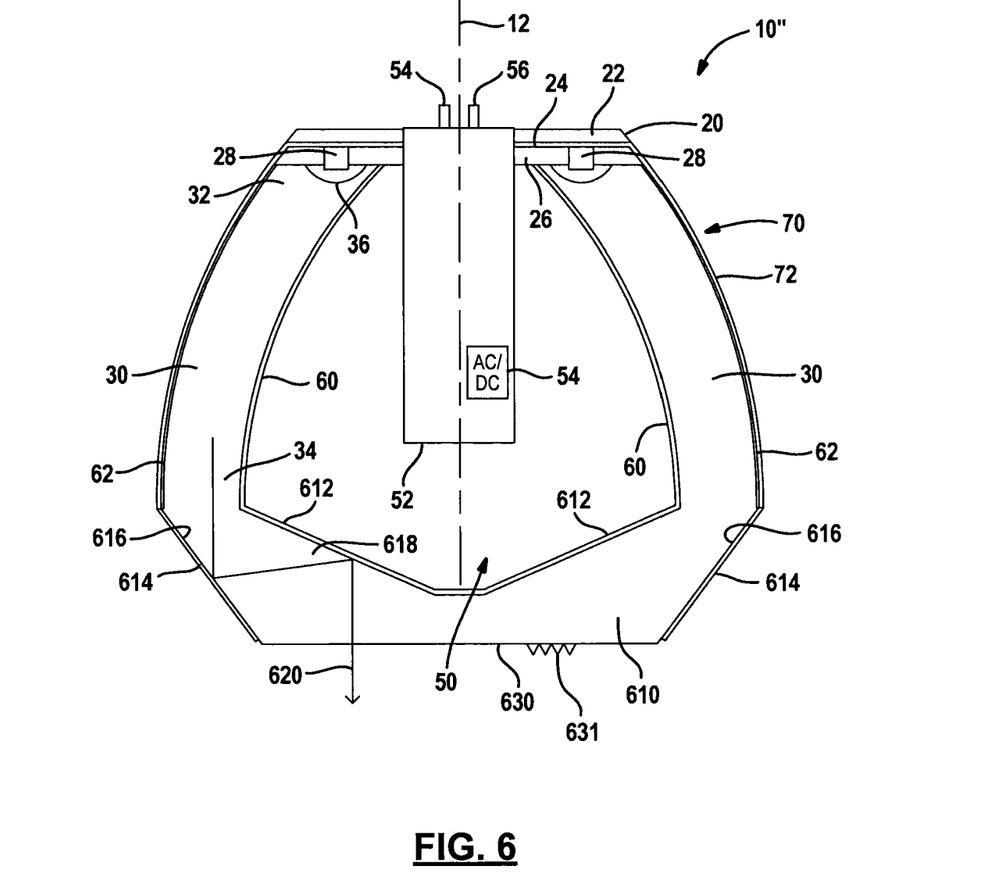
FIG. 6 is a cross-sectional view of a third embodiment of the light assembly present disclosure.

Referring now to FIG. 6, a similar embodiment of the light assembly 10' to that illustrated in FIG. 1 is set forth. In this embodiment, the light pipes 30 have a cover portion 610 thereon. The cover portion 610 covers the cavity 50 and is used for light redistribution. The cover portion 610 may also have a reflective coating 612 on the back side thereof. The reflective coating helps reflect light outward from the light assembly 10". A reflective coating 614 may also be disposed on an angled surface 616. The angled surface 616 reflects or redirects light toward the angled surface 618 which in turn reflects light outward from the light surface as illustrated by the arrow 620. The light travelling up the light tube from the light source 28 reflects from the first angular surface 16 and from the second angular surface 18 to reflect outward from a light-emitting surface 630 of the cover 610. The light-emitting surface 630 may also have light or beam-forming elements 631 disposed thereon to scatter the light or redirect the light as desired. The cover 610 helps redistribute the light across the light distribution surface 630.

Figure 7:
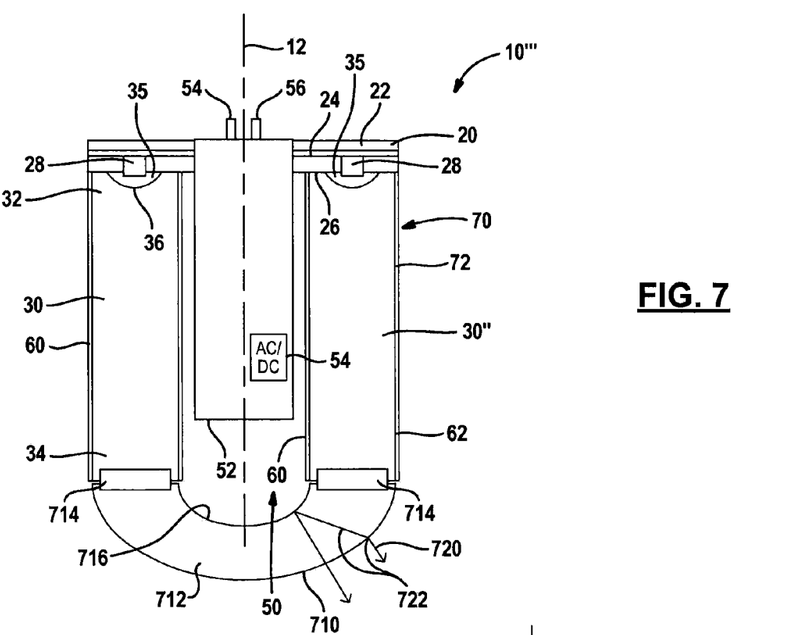
FIG. 7 is a cross-sectional view of a fourth embodiment of a light assembly of the present disclosure.

Referring now to FIG. 7, another embodiment of a light pipe 30" is set forth. The light pipes 30" extend perpendicularly from the surface of the circuit board 20'. In this embodiment, a cover 710 is also used. The cover 710 has a spherical outer surface 712. A coupler 714 is used for coupling the light pipe 30' to the cover 710. The coupler 714 allows light to pass from the light pipe 30" into the cover 710. The cover 710 also has a curved inner surface 716. Light from the light pipe 30" enters the cover 710 through the coupler 714. The light is partially emitted as illustrated by arrow 720 and is partially reflected as illustrated by arrow 722. The light reflected from the surface 712 reflects from the surface 716 and outward from the cover 720. In this manner, the light is more distributed across the surface of the cover 710.

Figure 8:
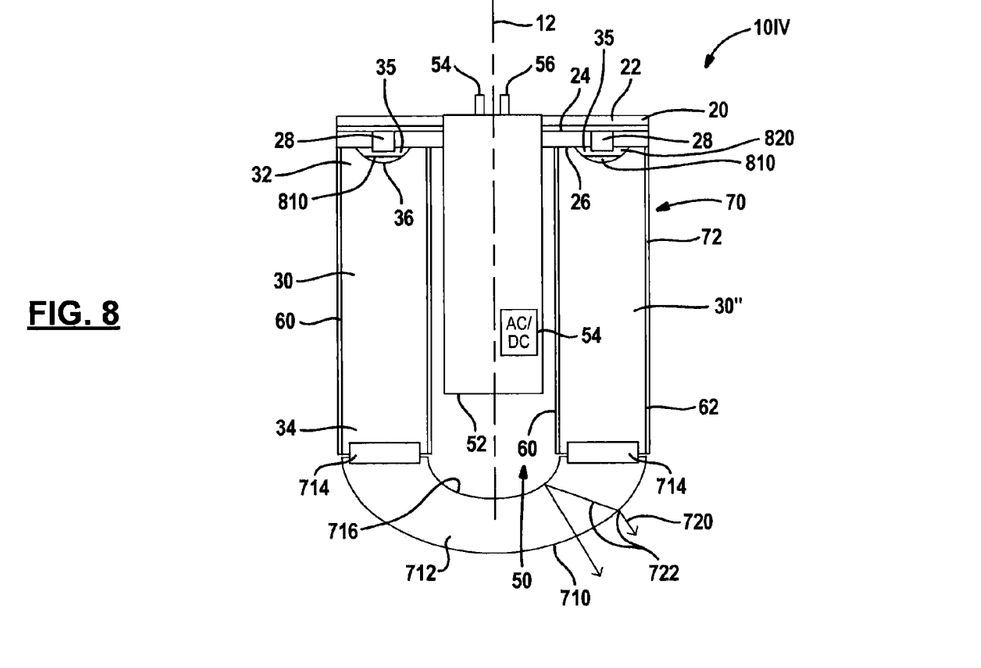
FIG. 8 is cross-sectional view of a light assembly according to a fifth embodiment of the present disclosure.

Referring now to FIG. 8, a similar embodiment to that illustrated in FIG. 7 is set forth. However, in this embodiment, a wavelength-shifting element or light-shifting element 810 is illustrated. In this embodiment of the light assembly $10^{iv}$, the light from the light source 28 is directed through a light-shifting element 810. The light-shifting element 810 may also be referred to as a wavelength-shifting element. The light source 28 may generate light at a first wavelength and the wavelength-shifting 18 changes the wavelength to a second wavelength. One example of wavelength-shifting is blue light from the LED shifted to white light. The light from the light sources may pass directly through the light-shifting or wavelength-shifting element 810 to perform the wavelength-shifting. In this embodiment, the wavelength-shifting element 810 is disposed adjacent to the light source 28 within a cavity 820 that forms the collimating element. Thus, the light traveling down the light pipe is light-shifted light in FIG. 8.

Figure 9A:
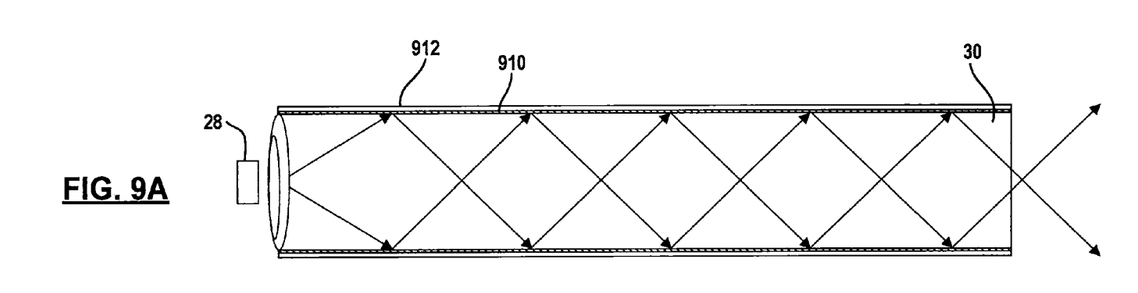
FIG. 9A is a partial cross-sectional view of a light tube.
Figure 9B:
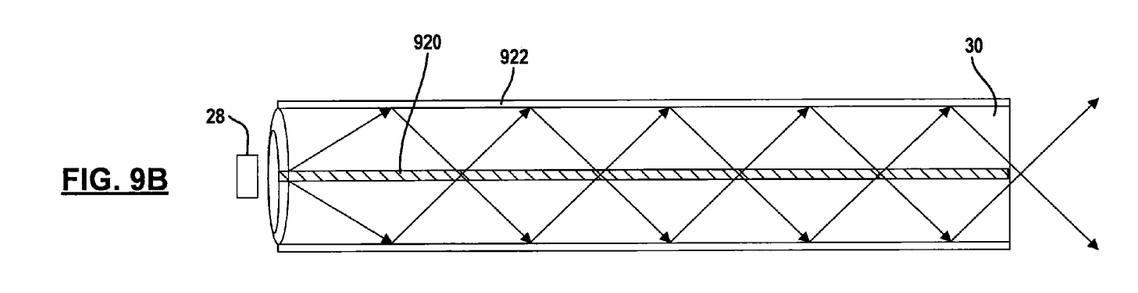
FIG. 9B is a cross-sectional view of a light tube having a wavelength for a light-shifting element therein.
Figure 9C:
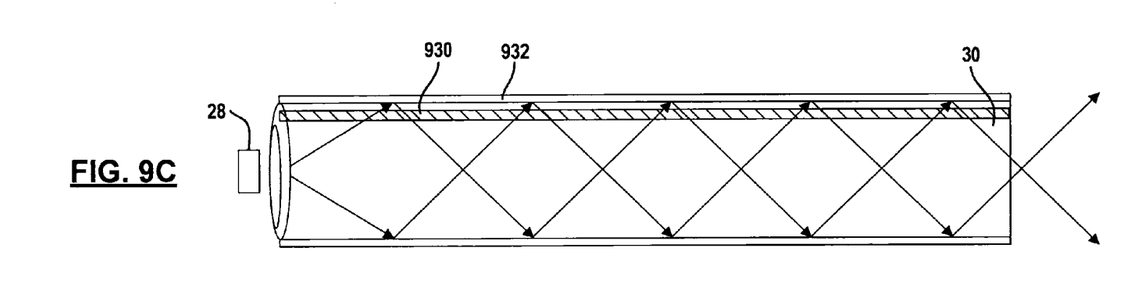
FIG. 9C is a cross-sectional view of a light tube having a light-shifting element or wavelength-shifting element in a second position.

Referring now to FIG. 9A, the light source 28 is illustrated adjacent to a light pipe 30. The light pipe 30 in FIGS. 9A-9C is illustrated as a cylindrical light pipe. However, the light pipe may represent any one of the above-illustrated light pipes such as the curved light pipe shown in FIGS. 1, 5 and 6. Also, various cross-sections of light pipes may be used. In this embodiment, a wavelength-shifting element 910 is disposed adjacent to the outer surface of the light pipe 30. The wavelength-shifting element 910 shifts the wavelength of the light incident upon the outer surface so that as the light travels down the light tube 30, the light travels into the light-shifting element. In response, the wavelength of the light is shifted to a second wavelength different than the first wavelength. The wavelength output may be tailored for the application, such as home use, agricultural use and inspection system use. Various types of films and coatings may be used. In addition to the wavelength-shifting element 910, a coating 912 may be disposed on the outside of the wavelength-shifting element 910.

Referring now to FIG. 9B, a wavelength-shifting element 920 is disposed within the light pipe 30. The wavelength-shifting element 920 may be integrally molded within the light tube and extend across the entire diameter of the light tube. As the light passes down and through the light pipe 30, the light is shifted to a different wavelength. The wavelength-shifting element 920 may not provide 100% efficiency at a first pass therethrough and thus light will have its wavelength shifted as it passes through the wavelength-shifting element 920. In this embodiment, the wavelength-shifting element is located near or at the center of the light pipe 30.

A coating 922 may also be formed on the outside of the light pipe 30 to help reflect light within the light pipe and keep the light within the light pipe.

Referring now to FIG. 9C, another embodiment of the light pipe 30 is illustrated that includes a light-shifting element 930. The light-shifting element 930 is disposed adjacent to one surface of the light pipe 30. As light travels down the light pipe 30, light travels through the wavelength-shifting element 930 and is shifted in wavelength to a second wavelength. As discussed above, the wavelength-shifting element 930 may not be 100% efficient and thus more light wavelengths are shifted as the reflected light passes through the wavelength-shifting element 930.

In this embodiment, a coating 932 may also be disposed on the outer surface of the light pipe 30.

Figure 10:
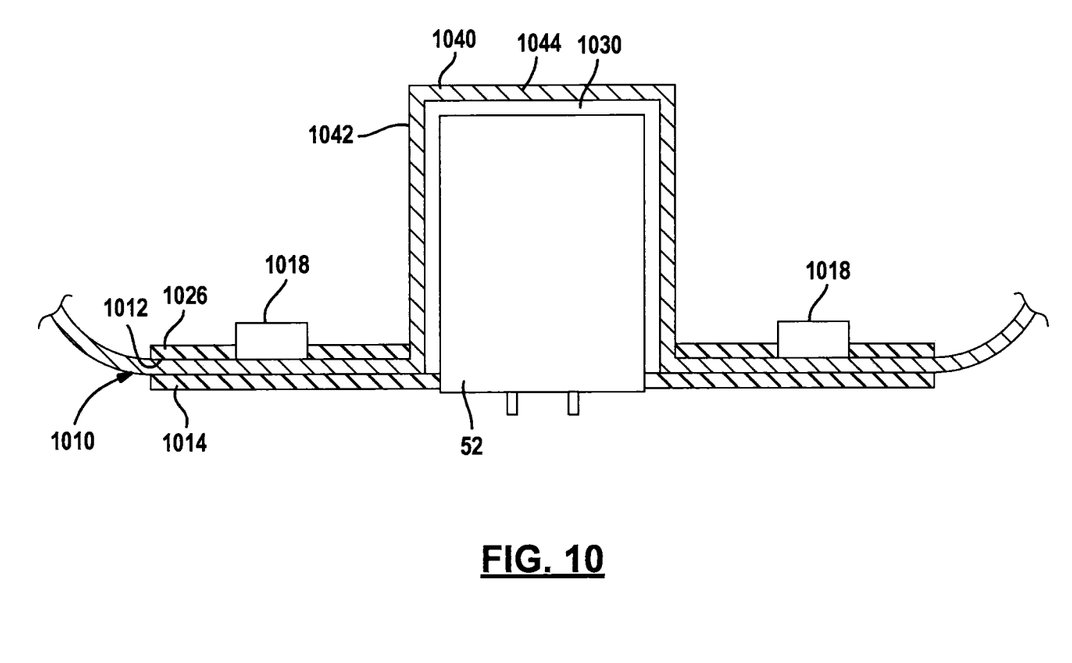
FIG. 10 is a cross-sectional view of a light assembly having a shielded driver circuit according to the present disclosure.

Referring now to FIG. 10, another embodiment of a circuit board 1010 is set forth. In this embodiment, a conductive layer 1012 has a first insulating layer 1014 and a second insulating layer 1016 thereon. A light source 1018 is mounted to the conducting layer 2012. In this embodiment, the conducting layer extends to form a cavity 1030 that is used to receive the driver circuit board 52. The driver circuit board 52 may have high frequency components thereon. By providing a conductive circuit board 1030, an enclosure 1040 may be formed around the circuit board 52 to shield any RF interference generated by the high-frequency components of the driver circuit board 52. The enclosure 1040 illustrated has a first sidewall 1042 and a top portion 1044. The sidewall may extend around the driver circuit board 52 and the top wall 1044 may extend over the driver circuit board 52. To further promote RF isolation, the enclosure 1040 may be electrically coupled to ground potential. However, the enclosure 1040 may also be electrically isolated.

In forming the circuit board 1010, the metal portions may be stamped to provide the desired circuit traces. The metal may then be over-molded with the insulating layers 1012 and 1014. After molding, further refinements of the circuit traces may be formed by laser cutting or other types of machining if desired.

Figure 11:
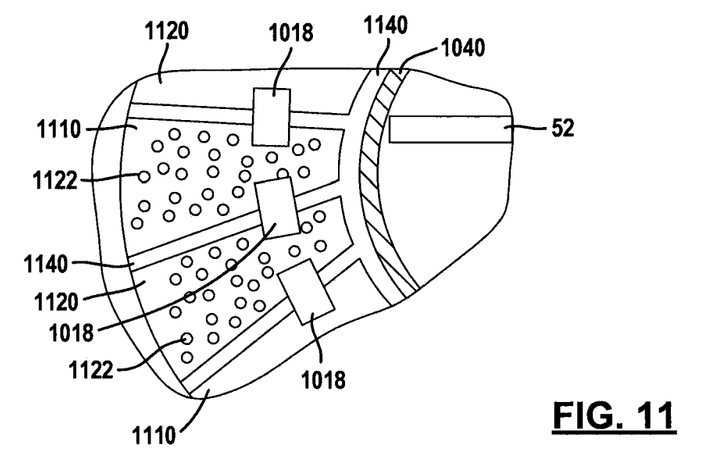
FIG. 11 is a top view of light-emitting diodes or other light sources mounted to a circuit board such as that illustrated in FIG. 10.

Referring now to FIG. 11, a partial top cross-sectional view of the enclosure 1040 of FIG. 10 is set forth. In this example, a plurality of light sources is electrically coupled to two different polarity segments 1110 and 1120. Thermal vias 1122 are also disposed on the circuit board. In this embodiment, a gap 1140 is provided between each of the adjacent polarity portions 1110, 1120 and the enclosure 1040. The gap 1140 is non-conducting and therefore the different polarities used to rate the light sources 1018 is provided.

Figure 12:
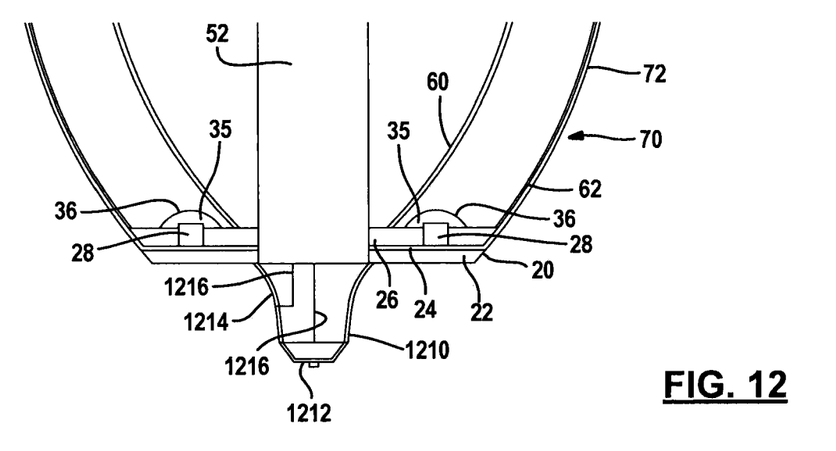
FIG. 12 is a cross-sectional view of a light assembly formed having a standard Edison base.

Referring now to FIG. 12, the light assembly may also include a standard Edison base 1210. The standard Edison base 1210 is one example of an alternative base used for a light bulb. An Edison base 2010 has a first polarity portion 1212 and a second polarity portion 1214. The first polarity portion 1212 is coupled to one lead 1216 of the circuit board 52. The second polarity 1214 is coupled to a second lead 1218 coupled to the circuit board 52.

The base 1210 may be formed of a material that is conductive in different regions and separated by a non-conductive area. Of course, different styles and shapes of bases for different applications may be provided.

Figure 13:
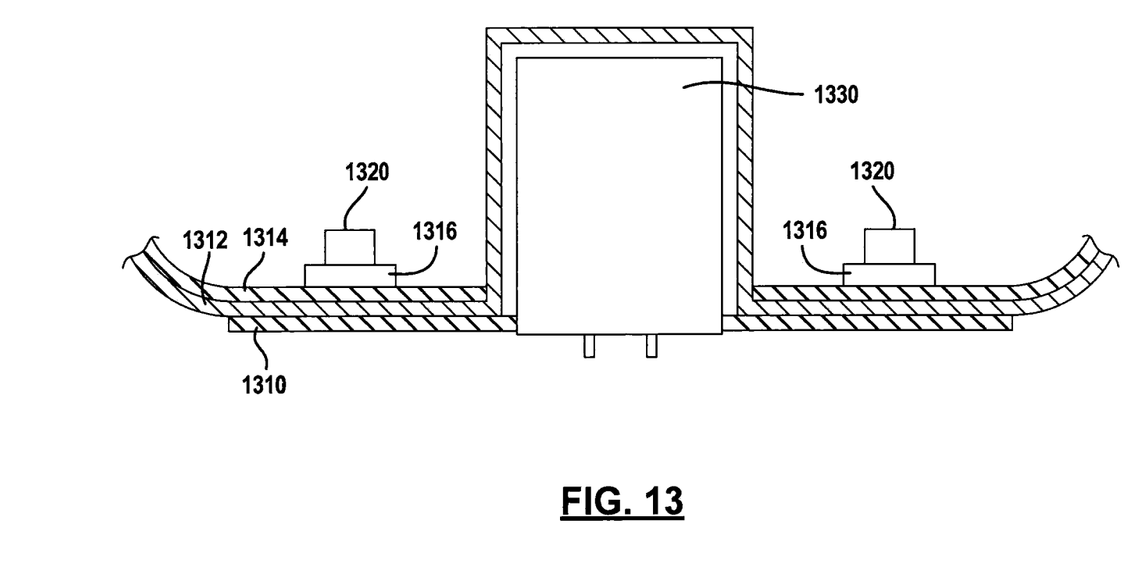
FIG. 13 is a cross-sectional view of an alternative circuit board according to the present disclosure.

Referring now to FIG. 13, an alternative cross-sectional view of a light circuit board with a light source thereon is set forth. In this example, a non-electrically conducting layer 1310 is illustrated. A conductive layer 1312 has an oxide layer 1314 associated therewith. The oxide layer 1314 is a non-electrically, but thermally, conductive layer. The conducting layer 1312 may be stainless steel, aluminum or another type of electrically conducting metal. The non-conducting layer 1314 may be an anodized layer or an oxide layer formed on the metal. On top of the non-conducting layer 1314 circuit traces 1316 may be disposed thereon. An example of a suitable circuit trace 1316 may be a printed conductive ink. A light-emitting diode 1320 may be electrically coupled to the circuit trace 1316. In this example, the conductive layer 1312 may be stamped to form the cavity for receiving the circuit boards 1330 therein. Both the conductive layer and the non-conductive oxide or anodized layer 1314 may also be stamped and formed in the same manner. The circuit traces 1316 may be applied to the non-conducting layer 1314 and the light-emitting diodes 1320 electrically coupled thereto by reflow soldering or the like. The whole assembly may then be over-molded with the non-conductive layer 1310. Thereafter, lasers or other cutting techniques may be used to electrically isolate or separate the solid conducting layers 1312 to form different polarities. One pattern for cutting conductive traces is illustrated in FIG. 14 below.

Figure 14:
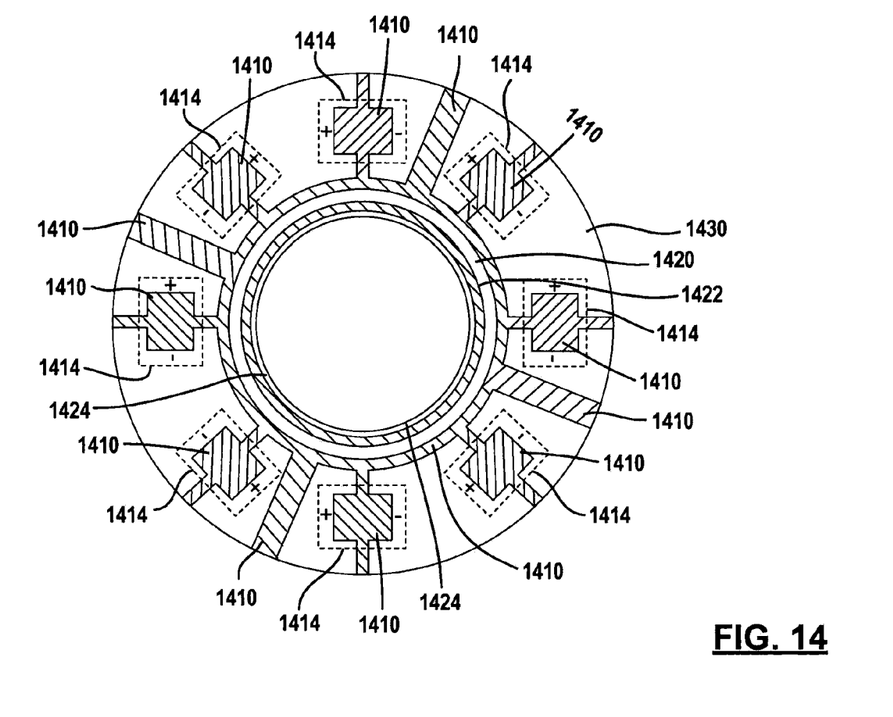
FIG. 14 is a top view of an alternative circuit board according to the present disclosure.

Referring now to FIG. 14, a top view of the circuit board illustrated in FIG. 13 is set forth. In this example, gaps or cuts 1410 are provided through the conductive layer 1312 so that different regions are isolated on the circuit board. In the cut areas 1410, the polarities of adjacent components are separated. Pluses and minuses are disposed on the surface to illustrate a cathode and anode of the light-emitting diode may be disposed thereon on each conductive surface. A light source such as the light-emitting diode 1414 is illustrated straddling a cut 1410. Adjacent light-emitting diodes 1410 may thus be connected in series because the cathode of one light-emitting diode is coupled to the anode of an adjacent light-emitting diode. Various other interconnections may also be desired to be formed. Another cut 1420 is an annular cut to separate a positive potential and negative potential (ground) regions. A positive potential circuit trace 1422 and a negative potential circuit trace 1424 are set forth. When interconnections are desired from the solder pad regions 1430, wire-bonding techniques may be used for the interconnections. Essentially the two different polarity traces are annular.

Figure 15:
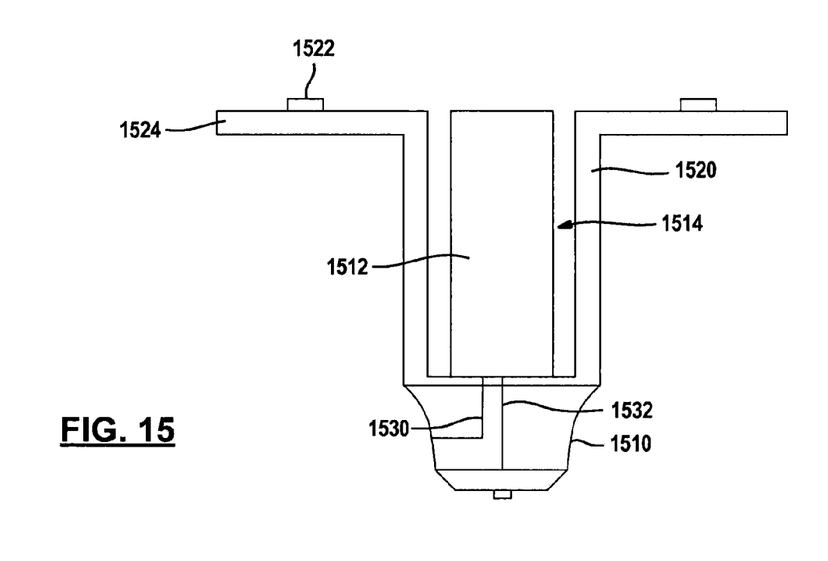
FIG. 15 is a cross-sectional view of an alternative view of the conducting layer formed according to the present disclosure.

Referring now to FIG. 15, the same techniques described above may also be used for an inverted-type system. In this system, a base 1510 may be interconnected with a driver circuit board 1512. The driver circuit board 1512 may be disposed in a cavity 1514 that is provided the conductive layer 1520. The LEDs 1522 may be mounted directly on the conductive layer or on solder pads disposed on a second conductive layer spaced apart from the conductive layer 1524.

Leads 1530 and 1532 may interconnect the circuit board to the base 1510 and provide different polarities for operating the driver circuit board 1512 and ultimately the light-emitting diodes 1522 or other types of light sources.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A light assembly having an axis of symmetry comprising:
    a light source circuit board;
    a plurality of light-emitting diodes disposed on the light-emitting diode circuit board;
    a plurality of light pipes axially extending from and adjacent to each light-emitting diode, each light pipe having a respective first end adjacent to the plurality of light-emitting diodes and a second end opposite to the light-emitting diodes, said plurality of light pipes communicating light from the light-emitting diodes therethrough and defining a cavity therebetween;
    a plurality of thermal vanes forming a heat sink for removing heat from the light-emitting diodes, said plurality of thermal vanes extending adjacent the plurality of light pipes; and
    a driver circuit board disposed within the cavity.

2. A light assembly as recited in claim 1 wherein the plurality of light-emitting diodes are disposed in a first ring on the light source circuit board and have a center point aligned with the axis of symmetry.

3. A light assembly as recited in claim 1 wherein the first end of each of the plurality of light pipes comprises a collimating optic within a cavity adjacent to the respective light-emitting diodes.

4. A light assembly as recited in claim 3 wherein a wavelength-shifting element is disposed within the cavity to shift a wavelength of light emitted from the light-emitting diodes.

5. A light assembly as recited in claim 1 wherein the second end comprises a beam forming optic.

6. A light assembly as recited in claim 1 wherein the circuit board comprises at least one metallic layer and the plurality of thermal vanes extending from the metallic layer.

7. A light assembly as recited in claim 1 wherein the driver circuit board is disposed within a shielded enclosure within the cavity.

8. A light assembly as recited in claim 1 further comprising a cap adjacent to each of the plurality of second ends and enclosing the cavity, said cap having a light reflecting surface reflecting light out of the cap.

9. A light assembly as recited in claim 1 wherein the plurality of light pipes form a unitary structure.

10. A light assembly as recited in claim 1 wherein the light pipes are coated with a light-reflective coating on an external surface thereof.

11. A light assembly as recited in claim 1 wherein the light pipes each comprise a round cross-sectional area.

12. A light assembly as recited in claim 1 wherein the light pipes each comprise a rectangular cross-sectional area.

13. A light assembly as recited in claim 1 wherein the light pipes comprise a wavelength-shifting element for shifting the wavelength of light in the light pipes.

14. A light assembly as recited in claim 13 wherein the wavelength-shifting element is disposed on an outer surface of the light pipe.

15. A light assembly as recited in claim 13 wherein the wavelength-shifting element is disposed longitudinally within the light pipe.

16. A light assembly as recited in claim 1 wherein the circuit board is disposed on a plane perpendicular to an axis of symmetry of the light bulb.

17. A light assembly as recited in claim 1 wherein the circuit board comprises a plurality of wedge shaped sectors.

18. A light assembly as recited in claim 1 wherein the light pipes are coated with a reflective material.

19. A light assembly as recited in claim 1 wherein a beam-forming surface is formed on a cap that is disposed adjacent to and extending between each light pipe.

20. A light assembly having an axis of symmetry comprising:
    a light source circuit board having an electrically conductive layer;
    a plurality of light-emitting diodes disposed on the light source circuit board in a ring shape;
    a plurality of elongated light pipes axially extending from and adjacent to each of the plurality of light-emitting diodes, each light pipe having a first end adjacent to one of the plurality of light-emitting diodes and a second end opposite to the plurality of light-emitting diodes, said plurality of light pipes defining a cavity therebetween;
    a plurality of thermal vanes thermally coupled to the conductive layer and forming a heat sink for removing heat from the light-emitting diodes, said plurality of thermal vanes extending axially along and adjacent to the plurality of light pipes; and
    a driver circuit board disposed within the cavity.

* * * * *